(12) United States Patent
Kawamura et al.

(10) Patent No.: US 7,172,736 B2
(45) Date of Patent: Feb. 6, 2007

(54) COMPACT CHEMICAL REACTOR AND COMPACT CHEMICAL REACTOR SYSTEM

(75) Inventors: Yoshihiro Kawamura, Fussa (JP); Naotsugu Ogura, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 516 days.

(21) Appl. No.: 10/628,924

(22) Filed: Jul. 28, 2003

(65) Prior Publication Data
US 2004/0018129 A1 Jan. 29, 2004

(30) Foreign Application Priority Data
Jul. 29, 2002 (JP) .............. 2002-219205

(51) Int. Cl.
*B01J 8/04* (2006.01)
*B01J 3/00* (2006.01)
*C10L 3/00* (2006.01)

(52) U.S. Cl. .............. 422/190; 422/211; 48/127.7; 48/127.9; 48/198.1

(58) Field of Classification Search .......... 422/190, 422/211; 48/127.7, 127.9, 198.1; 429/19, 429/22, 17, 23
See application file for complete search history.

(56) References Cited

U.S. PATENT DOCUMENTS

| | | | |
|---|---|---|---|
| 5,716,842 A | 2/1998 | Baier et al. | |
| 6,200,536 B1* | 3/2001 | Tonkovich et al. | 422/177 |
| 6,428,758 B1* | 8/2002 | Schuessler et al. | 422/239 |
| 6,447,736 B1* | 9/2002 | Autenrieth et al. | 422/190 |
| 6,638,654 B2 | 10/2003 | Jankowski et al. | |
| 6,786,716 B1* | 9/2004 | Gardner et al. | 431/268 |
| 6,824,905 B2 | 11/2004 | Shioya et al. | |
| 6,916,565 B2 | 7/2005 | Shioya | |
| 2002/0094462 A1* | 7/2002 | Shioya et al. | 429/19 |
| 2003/0039874 A1 | 2/2003 | Jankowski et al. | |
| 2003/0103878 A1 | 6/2003 | Morse et al. | |
| 2003/0138685 A1* | 7/2003 | Jankowski et al. | 429/30 |
| 2004/0018129 A1 | 1/2004 | Kawamura et al. | |
| 2004/0025784 A1 | 2/2004 | Kawamura et al. | |
| 2004/0043273 A1 | 3/2004 | Jankowski et al. | |
| 2004/0048128 A1 | 3/2004 | Jankowski et al. | |

(Continued)

FOREIGN PATENT DOCUMENTS

DE 199 20 786 A1 11/2000

(Continued)

OTHER PUBLICATIONS

Derwent Abstract Accession No. 2003-407946/39, Class J04 L03, JP 2003-045459 A (Casio Computer Co. LTD), Feb. 14, 2003.

(Continued)

*Primary Examiner*—N. Bhat
(74) *Attorney, Agent, or Firm*—Frishauf, Holtz, Goodman & Chick, P.C.

(57) ABSTRACT

A compact chemical reactor has a first substrate. A catalyst layer is provided on an inner surface of a groove formed in a first surface of the first substrate. A second substrate, in which a concave portion to receive a portion of the catalyst layer is formed on a surface opposite to the first surface of the substrate, contacts the first substrate on the opposite surface.

20 Claims, 15 Drawing Sheets

U.S. PATENT DOCUMENTS

| | | |
|---|---|---|
| 2004/0148858 A1 | 8/2004 | Yamamoto et al. |
| 2004/0148859 A1 | 8/2004 | Kawamura et al. |

FOREIGN PATENT DOCUMENTS

| | | |
|---|---|---|
| DE | 100 10 400 A1 | 9/2001 |
| EP | 1 022 059 A2 | 7/2000 |
| JP | 2-172538 A | 7/1990 |
| JP | 5-235510 | 9/1993 |
| JP | 6-233918 A | 8/1994 |
| JP | 8-508197 | 9/1996 |
| JP | 10-268343 | 10/1998 |
| JP | 10-284836 | 10/1998 |
| JP | 2000-506432 A | 5/2000 |
| JP | 2002-18271 A | 1/2002 |
| WO | WO 00/45457 A1 | 8/2000 |
| WO | WO 02/24322 A2 | 3/2002 |
| WO | WO 03/082460 A1 | 10/2003 |
| WO | WO 2004/030805 A1 | 4/2004 |

OTHER PUBLICATIONS

Derwent Abstract Accession No. 2003-581644/55, Class E36 L03, JP 2003-168685 A (Casio Computer Co. LTD), Jun. 13, 2003.

Poser, S. et al. "Chip elements for fast thermocycling" Sensors and Actuators A, Elsevier Sequoia S.A., Lausanne, CH, vol. 62, No. 1-3, Jul. 1, 1997, pp. 672-675, XP004119707, ISSN: 0924-4247.

Srinivasan R. et al., "Micromachined Reactors For Catalytic partial Oxidation Reactions" Aiche Journal, New York, NY US, vol. 43, No. 11, Nov. 1997, pp. 3059-3069, XP000669285, ISSN: 0001-1541.

* cited by examiner

COMPACT CHEMICAL REACTOR AND COMPACT CHEMICAL REACTOR SYSTEM

CROSS-REFERENCE TO RELATED APPLICATIONS

This application is based upon and claims the benefit of priority from the prior Japanese Patent Application No. 2002-219205, filed Jul. 29, 2002, the entire contents of which are incorporated herein by reference.

BACKGROUND OF THE INVENTION

1. Field of the Invention

This invention relates to a compact chemical reactor and a system constituted of compact chemical reactors.

2. Description of the Related Art

In the technical field of chemical reactions, a chemical reactor is known which produces a desired fluid material by a chemical reaction of a fluidized mixture in the presence of a catalyst provided in a flow path. In such a chemical reactor, a groove, which becomes a minute flow path on a silicon substrate, is formed using a semiconductor integrated circuit micro working technique.

FIG. 16 is a plan view of an example of such a compact chemical reactor, and FIG. 17 is a sectional view along the line XVII—XVII of FIG. 16. This compact chemical reactor comprises a compact silicon substrate 1. In one surface of the silicon substrate 1, a minute meandering groove 2 is formed by use of the micro fabrication technique accumulated by the semiconductor production technique. A catalyst layer 3 is provided on an internal wall surface of groove 2.

A glass plate 4, which is to be a cover, is joined onto one surface of the silicon substrate 1. An inflow port 5 and an outflow port 6 which pass through the glass plate 4 in a thickness direction of the glass plate 4 are formed at two predetermined positions of the glass plate 4 corresponding to both ends of the groove 2.

Next, one example of a method for forming the groove 2 on the silicon substrate 1 of this chemical reactor will be described. First, as shown in FIG. 18, the meandering minute groove 2 is formed in one surface of the compact silicon substrate 1, by use of the micro fabrication technique. Next, a photoresist pattern 11 having an aperture 12 at a portion corresponding to the groove 2 is formed by applying a photoresist to one surface of the silicon substrate 1 including the inner surface in the groove 2 and then patterning this photoresist.

Next, the catalyst layer 3 is formed on the inner surface of the groove 2 and on a surface of the photoresist pattern 11 including an inner peripheral surface of the aperture 12. Then, as shown in FIG. 19, the photoresist pattern 11 is removed together with unnecessary portions of the catalyst layer 3 formed on an upper surface of the photoresist pattern 11, and as shown in FIG. 20, the catalyst layer 3 remains only on the inner wall surface of the groove 2. In this case, the photoresist pattern 11 is removed by a method using an exfoliation liquid or a method based on oxygen plasma ashing.

In the production method described above, when the photoresist pattern 11 is removed together with the unnecessary portions of the catalyst layer 3 formed on an upper surface of the photoresist pattern 11 using the exfoliation liquid, the catalyst layer 3 remaining on the inner wall surface of the groove 2 might be damaged by contact with the exfoliation liquid, and the catalyst layer 3 formed on the surface of the photoresist pattern 11 becomes an obstacle to prevent the exfoliation liquid for the exfoliation of the photoresist pattern 11 from sufficiently reaching the photoresist pattern 11, thus posing a problem that the photoresist pattern 11 sometimes cannot be removed satisfactorily. Alternatively, when the photoresist pattern 11 is removed together with the unnecessary portions of the catalyst layer 3 formed on the upper surface of the photoresist pattern 11 by the oxygen plasma ashing, the shadow of the catalyst layer 3 formed on the surface of the photoresist pattern 11 prevents a plasma seed from sufficiently reaching the photoresist pattern 11, thus posing a problem that the photoresist pattern 11 sometimes cannot be removed satisfactorily. Even if the photoresist pattern 11 can be removed satisfactorily, protrusions 3a of the catalyst layer 3 contacting the inner peripheral surface of the aperture of the photoresist pattern 11 remain as shown in FIG. 20, which will be an obstacle when the silicon substrate 1 and the glass plate 4 are joined, and thus the protrusions 3a are crushed to enter an interface portion 1a between the silicon substrate 1 and the glass plate 4 if they are forced to engage with each other, which produces a clearance between them, thus posing a problem that it is difficult for the groove 2 to allow a fluid flow without leakage.

Therefore, an advantage of this invention is that the photoresist for forming the catalyst layer in the groove that becomes the flow path can be removed satisfactorily without damaging the catalyst layer remaining in the groove.

BRIEF SUMMARY OF THE INVENTION

A compact chemical reactor according to the present invention has a first substrate; a catalyst layer provided on an inner surface of a groove formed in a first surface of the first substrate; and a second substrate in which a concave portion to receive a portion of the catalyst layer is formed in a surface opposite to the first surface of the substrate and which contacts the first substrate on the opposite surface.

According to the present invention, even if a portion of the catalyst layer sticks out from the first surface of the first substrate during a production process, the first substrate and the second substrate can be joined well because the portions of the catalyst layer or fragments thereof do not enter a joint surface between the first substrate and the second substrate.

Therefore, a space constituted of the groove and concave portion can be formed without making a clearance between the first substrate and the second substrate, thereby making it possible to introduce materials to react chemically with the catalyst layer into this space without leakage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
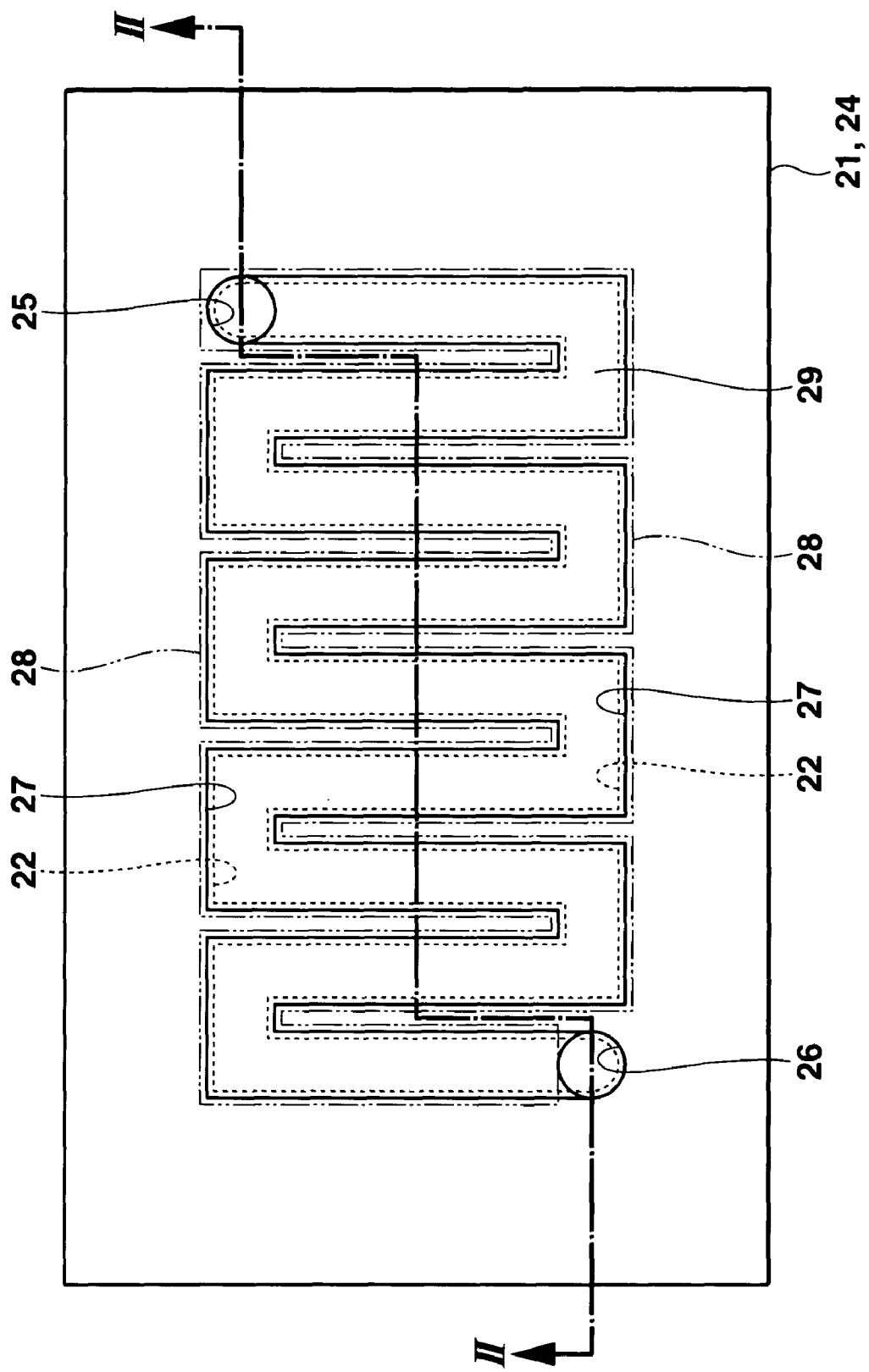
FIG. 1 is a plan view of a compact chemical reactor as one embodiment of this invention.
Figure 2:
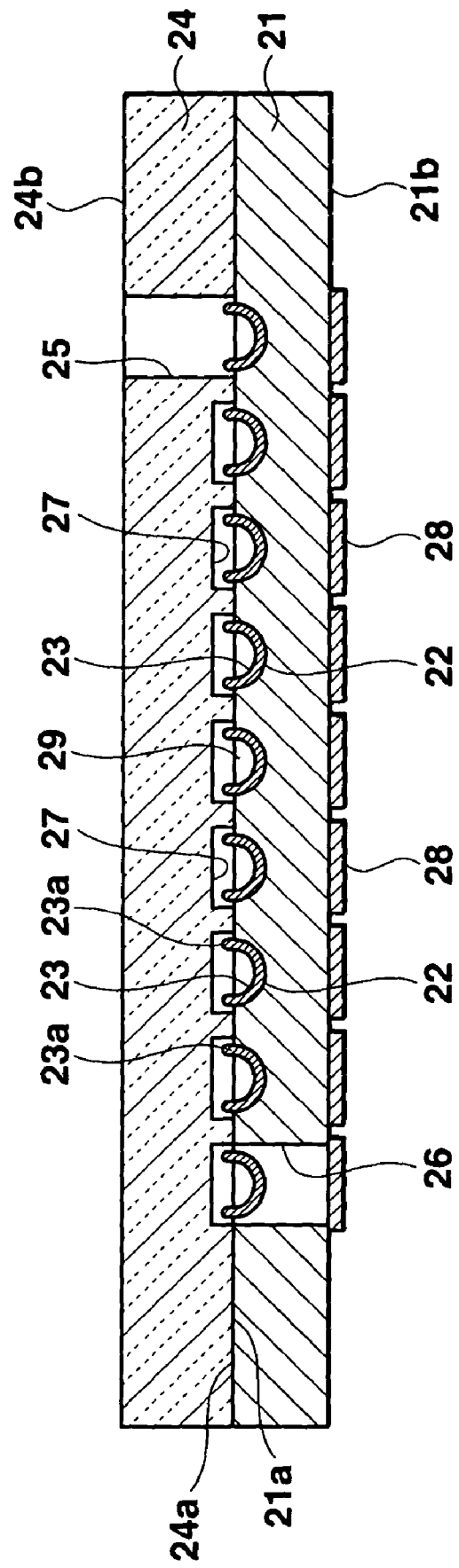
FIG. 2 is a sectional view along the line II—II of FIG. 1.

FIG. 1 is a plan view of a compact chemical reactor as one embodiment of this invention, and FIG. 2 is a sectional view along the line II—II of FIG. 1. This compact chemical reactor comprises a compact first substrate 21 formed of a material having a thermal conductivity of 100 or more which is made of crystalline silicon (monocrystalline silicon or polycrystalline silicon), aluminum or the like. In terms of size, the substrate 21 has a length of about 25 mm, a width of about 17 mm, and a thickness of about 0.4 to 1.0 mm, as an example. In a first flat surface 21a of the substrate 21, a groove 22, which becomes a meandering minute flow path 29, is formed by use of a micro fabrication technique. In terms of size, the groove 22 has a width of about 0.2 to 0.8 mm, a depth of about 0.2 to 0.6 mm and an entire length of about 30 to 1000 mm, as an example.

A catalyst layer 23 is provided entirely on an the groove 22. The kind of catalyst layer 23 differs according to the reaction caused by the compact chemical reactor, and its thickness is preferably about 10 to 100 μm. An inflow port 26 whose cross section is circular that penetrates in a thickness direction the substrate 21 is formed at a predetermined position corresponding to one end of the groove 22 of the substrate 21, and the groove 22 is in communication with the inflow port 26 at its one end. An opposite second substrate 24 made of glass which has a thickness of about 0.7 mm and is to be a cover is joined onto the first surface 21a of the substrate 21. An outflow port 25 whose cross section is circular that penetrates in a thickness direction the opposite substrate 24 is formed at a predetermined position of the opposite substrate 24 corresponding to the other end of the groove 22, and the groove 22 is in communication with the outflow port 25 at it's the other end.

A concave portion 27 is formed at a portion corresponding to protrusions 23a of catalyst layer 23 in a first surface 24a of the opposite substrate 24 facing to the first surface 21a of the substrate 21. The concave portion has a width of about 0.21 mm to 1.5 mm and a depth of 0.1 mm to 0.3 mm, and the depth of the concave portion 27 is larger than the height of the protrusions 23a, and moreover the width of the concave portion 27 and the diameter of the outflow port 25 and the inflow port 26 are set to be 105% or more of the width of the groove 22 (preferably, less than 150%). By setting the width of the concave portion 27 larger than the width of the groove 22 in this way, the protrusions 23a protruding from the groove 22 can be received in the concave portion 27 even if some displacement occurs when the substrate 21 and the opposite substrate 24 are bonded.

The protrusions 23a of the catalyst layer 23 protrude upward from the first surface 21a of the substrate 21 or outward from the first surface 21a of the substrate 21 on peripheral edges of the groove 22. The protrusions 23a protruding upward from an inner wall surface of the groove 22 may be formed entirely at both of the ends of the catalyst layer 23 along the groove 22 or may be formed in part at both of the ends.

The flow path 29 constituted of the groove 22 and the concave portion 27 has such a structure that a fluid comes in from a second surface 21b opposite to the first surface 21a of the substrate 21 via the inflow port 26, and the fluid is discharged from a second surface 24b opposite to the first surface 24a of the opposite substrate 24 via the outflow port 25.

A thin film heater 28 made of an electrically resistive element thin film such as TaSiOx or TaSiOxN (x is a positive numeric value) is formed along the catalyst layer 23 and thus the groove 22 in the second surface 21a, on the second flat surface 21b of the substrate 21. The meandering thin film heater 28 flatly corresponds to the meandering groove 22, but may not correspond thereto. Further, the thin film heater 28 may be in an overlaying state to cover the entire groove 22. When a chemical reaction (catalytic reaction) in the compact chemical reactor involves a reaction based on predetermined heat conditions, the thin film heater 28 generates heat with a voltage supplied from an unshown wire, supplies predetermined heat energy to the catalyst layer 23 in the groove 22 during the chemical reaction, and thus causes the reaction or promotes the reaction.

Figure 3:
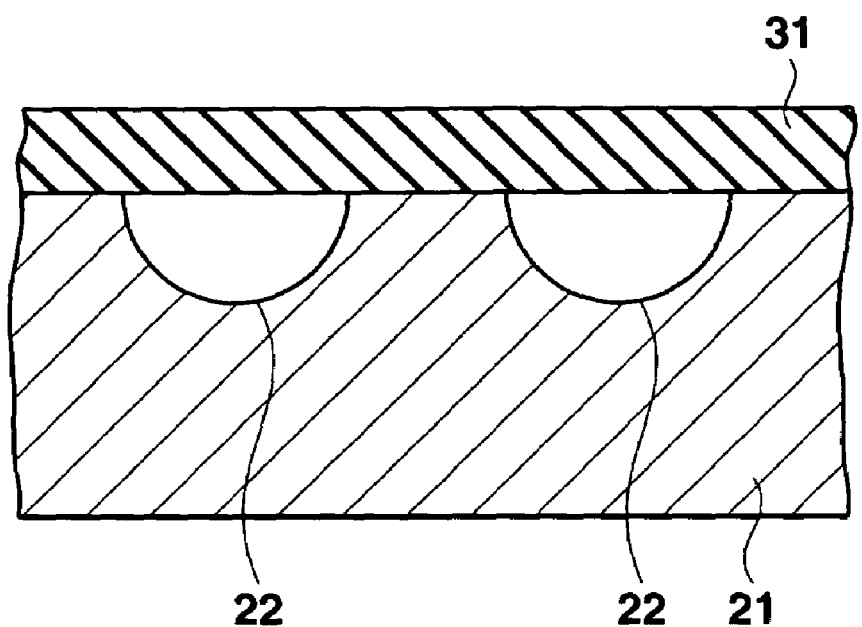
FIG. 3 is a sectional view of an initial process for production of a first example of the compact chemical reactor shown in FIG. 1 and FIG. 2.

Next, a first example of a method for producing the compact chemical reactor will be described. First, in the first surface 21a of the compact substrate 21, the meandering minute groove 22 and the inflow port 26 are formed by use of a micro fabrication technique, as shown in FIG. 3. In this case, the groove 22 may be formed by wet etching or dry etching, but should preferably be formed by a sandblast method. This is because the sandblast method provides a high process rate and uses a relatively inexpensive apparatus.

Figure 4:
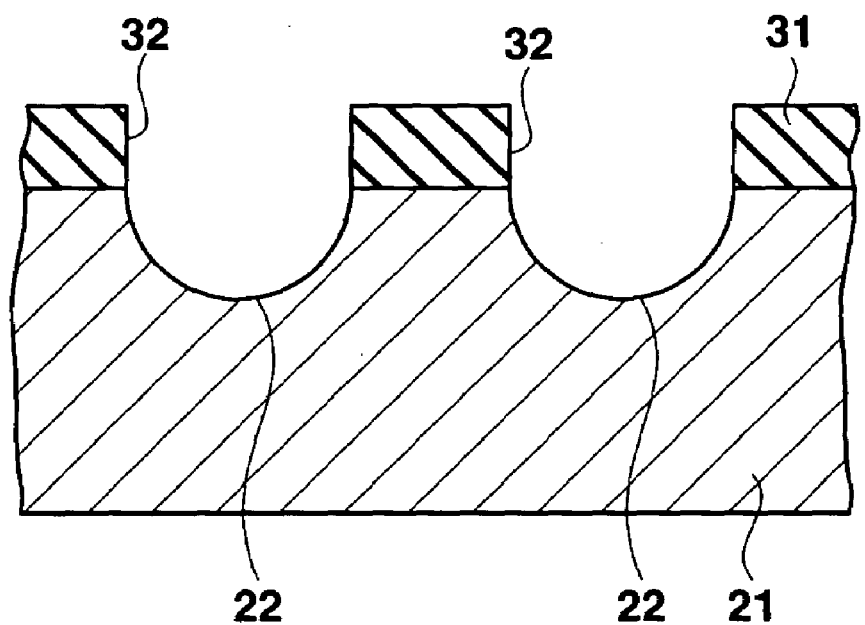
FIG. 4 is a sectional view of a process following FIG. 3.

Next, a photoresist 31 made of a dry film is affixed to the first surface 21a of the compact substrate 21. In this state, since the photoresist 31 is the dry film, it is not affixed onto an inner surface of the flow path 29, so that the flow path 29 is hollow inside. Next, the photoresist 31 is patterned to form an aperture 32 at a portion of the photoresist 31 corresponding to the groove 22, as shown in FIG. 4. In this case, the width of the aperture 32 is about the same as the width of the groove 22.

Figure 5:
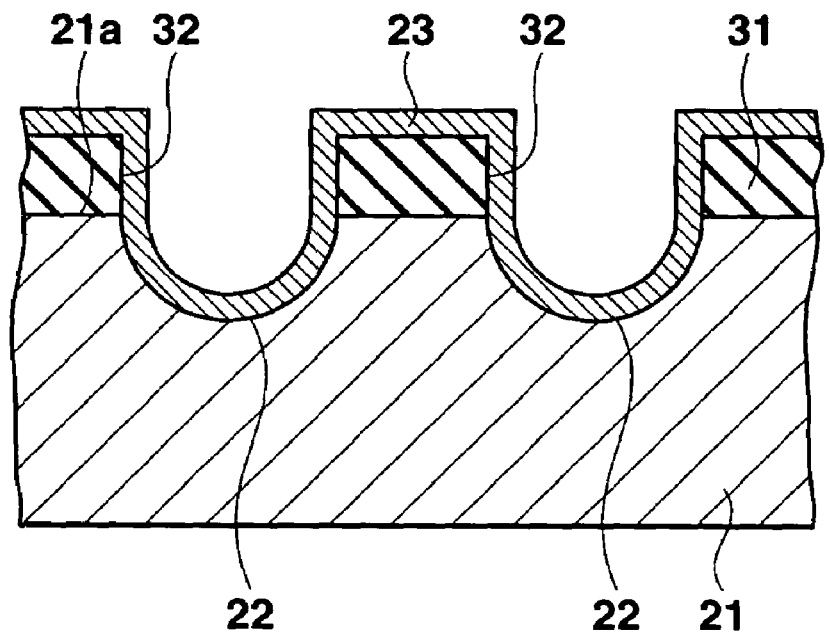
FIG. 5 is a sectional view of a process following FIG. 4.

Next, as shown in FIG. 5, the catalyst layer 23 is formed by applying a catalyst liquid solution, which is made by dispersing catalyst particles in a solvent, to a surface of the photoresist 31 including the inner surface of the groove 22 and an inner peripheral surface of the aperture 32, or is formed by a physical film formation method such as a sputtering method. This catalyst layer 23 may be a layer made only of a catalyst material or may be a layer in which catalyst particles are supported on surfaces of pores in a porous aluminum oxide layer.

Figure 6:
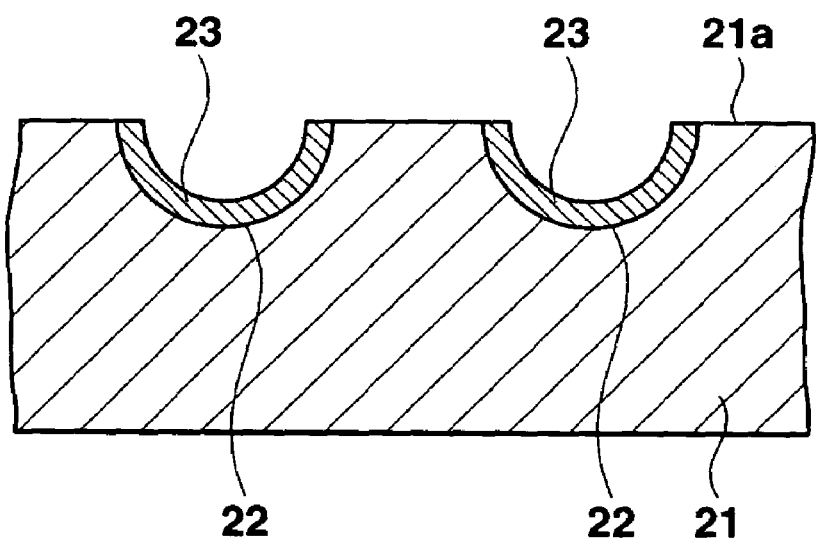
FIG. 6 is a sectional view of a process following FIG. 5.

Next, the photoresist 31 is removed by peeling off with a mechanical force together with unnecessary portions of the catalyst layer 3 formed on the photoresist pattern 31, and thus as shown in FIG. 6, the catalyst layer 23 remains only on the inner wall surface of the groove 22.

In this way, since a photoresist made of the dry film is used for the photoresist 31, and the photoresist 31 is removed by peeling off with a mechanical force together with the unnecessary portions of the catalyst layer 23 formed on the photoresist pattern 31, the photoresist 31 made of the dry film can be removed well without damaging the catalyst layer 23 remaining on the groove 22.

A small amount of resist scum may sometimes remain on the first surface 21a of the substrate 21 when the photoresist 31 is peeled off with a mechanical force, and in this case, the resist scum is removed by a descum treatment such as oxygen plasma ashing. This is carried out to ensure anode connection, described later, of the opposite substrate 24 to the first surface 21a of the substrate 21.

Figure 7:
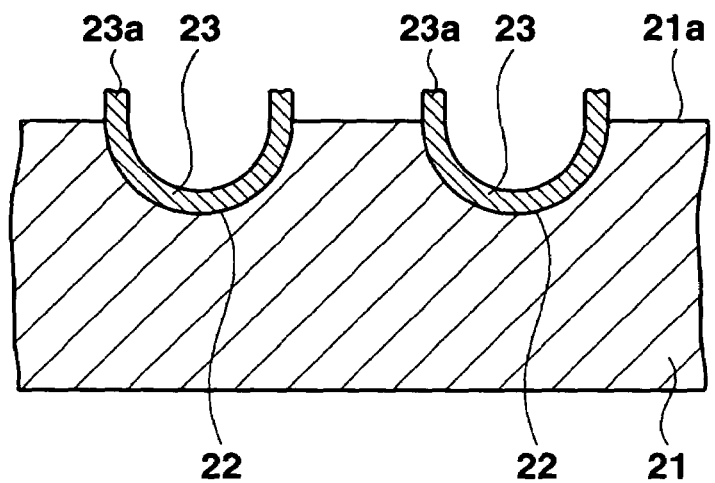
FIG. 7 is another sectional view of the same process as that shown in FIG. 6.

When the photoresist 31 is peeled off with a mechanical force, the protrusions 23a of catalyst layer 23 formed on the inner wall surface of the aperture 32 of the photoresist 31 as shown in FIG. 5 might not be removed together with the photoresist 31, and the protrusions 23a may sometimes stick upward and extend from the first surface 21a of the substrate 21 as shown in FIG. 7. In such a case, the protrusions 23a of the catalyst layer 23 sticking out and extending from the first surface 21a of the substrate 21 may be removed by polishing or the like, but it is extremely difficult to remove only the sticking-out portions by polishing or the like.

In other words, the first surface 21a of the substrate 21 needs to be a smooth surface in order to ensure the anode connection described later of the opposite substrate 24 to the first surface 21a of the substrate 21. Therefore, the first surface 21a of the substrate 21 is polished in advance to be a smooth surface. It is thus extremely difficult to completely remove only the protrusions 23a of the catalyst layer 23 sticking upward and extending from the first surface 21a of the substrate 21 by polishing or the like.

On the other hand, such a method is also available wherein the catalyst layer 23 sticking out and projecting from the first surface 21a of the substrate 21 is removed with some degree of re-polishing of the first surface 21a of the substrate 21. However, this makes production time longer because the first surface 21a of the substrate 21 is polished again after it has become a smooth surface by a previous polishing. In addition, particles of the substrate 21 and catalyst layer 23 formed by the polishing enter the clearance between the first surface 21a of the substrate 21 and the first surface 24a of the opposite substrate 24, thereby making it difficult to join the substrate 21 and the opposite substrate 24 with no space between them, for example. Therefore, the present invention allows the catalyst layer 23 sticking out and extending from the first surface 21a of the substrate 21 to remain thereon.

Furthermore, the photoresist 31 made of the dry film is affixed onto the first surface 21a of the substrate 21 in which the groove 22 is formed as shown in FIG. 3, and then the photoresist 31 is patterned to form the aperture 32 at the portion of the photoresist 31 corresponding to the groove 22, so that the position of the aperture 32 may sometimes displace from the groove 22. In such a case, if the width of the aperture 32 is about the same as the width of the groove 22, the protrusions 23a of catalyst layer 23 might remain on the first surface 21a located outside the groove 22. Even in such a case, the protrusions 23a of the catalyst layer 23 do not contact the first surface 24a of the opposite substrate 24 because the width of the concave portion 27 is wider than the width of the groove 22, so that if the substrate 21 is affixed to the opposite substrate 24, the protrusions 23a of the catalyst layer 23 remaining on the first surface 21a except for the groove 22 of the substrate 21 can remain. Therefore, it is possible to prevent the protrusions 23a from being broken due to the affixture to produce a clearance between the substrate 21 and the opposite substrate 24.

Next, the meandering thin film heater 28 made of a resistive element thin film such as TaSiOx or TaSiOxN (x is a positive numeric value) is formed on the other surface of the substrate 21 as shown in FIG. 1 and FIG. 2. Then, the outflow port 25 penetrating from the first surface 24a to the second surface 24b is formed, and the opposite substrate 24 in which the concave portion 27 is formed by a counter-boring process is prepared.

Next, the first surface 21a of the substrate 21 is superposed on the first surface 24a of the opposite substrate 24 so that both the surfaces face each other. At this point, the protrusions 23a of catalyst layer 23 formed on the substrate 21 are received by a space enclosed by the concave portion 27 of the opposite substrate 24, so as not to contact the opposite substrate 24. Then the substrate 21 and the opposite substrate 24 are joined by applying the anode joining process.

The anode joining process for joining the opposite substrate 24 to the substrate 21 made of silicon will here be described as an example. The first surface 24a of the opposite substrate 24 is superposed on the first surface 21a of the substrate 21, with a side of the substrate 21 as an anode and a side of the opposite substrate 24 as a cathode. Then, in a state where the substrate 21 and the opposite substrate 24 are heated to about 400 to 600° C., a direct-current voltage of about 1 kV is applied across both the poles.

Then, positive ions which are impurities in the opposite substrate 24 move in a direction away from the substrate 21, and a layer with a high concentration of negative charge oxygen ions emerges on the first surface 24a of the opposite substrate 24 contacting the substrate 21. Then, silicon ionized on the first surface 21a of the substrate 21 bonds to oxygen ions on the first surface 24a of the opposite substrate 24, thus making it possible to obtain a firm joint interface.

In this case, the reason why the substrate 21 and the opposite substrate 24 are heated to about 400 to 600C and a direct-current voltage of about 1 kV is applied across both the poles is to increase a rate of the positive ions which are impurities in the opposite substrate 24 moving in a direction away from the substrate 21, so as to facilitate the bonding between the substrate 21 and the opposite substrate 24.

Figure 8:
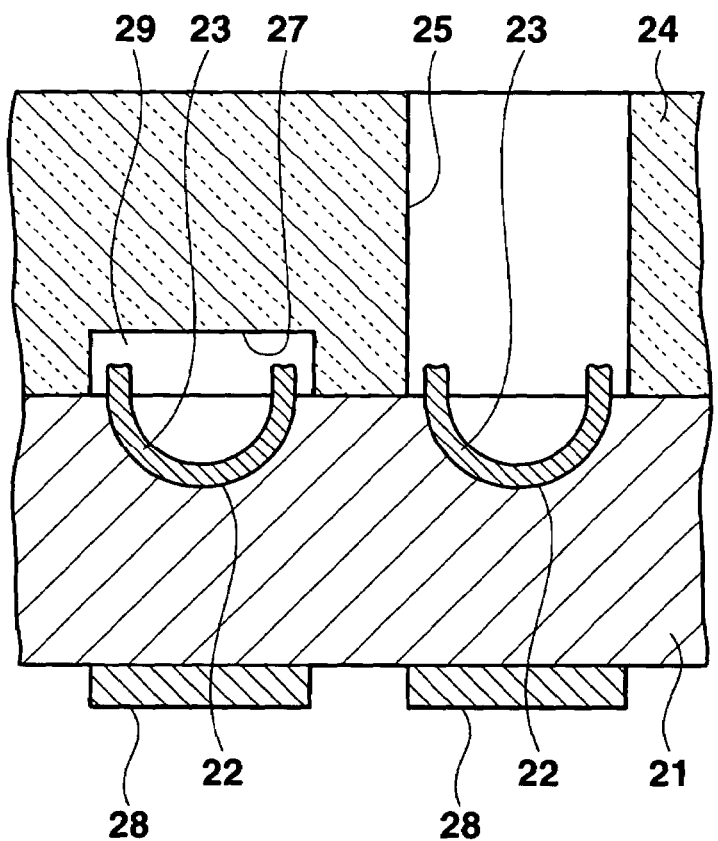
FIG. 8 is a sectional view showing to describe a portion of a joint state between both substrates in the case shown in FIG. 7.

As described above, even if the protrusions 23a of catalyst layer 23 sticking out on the first surface 21a of the substrate 21 and remaining remain, as shown in FIG. 7, the protrusions 23a of catalyst layer 23 sticking out and extending from the first surface 21a of the substrate 21 are received in a space in the concave portion 27, the outflow port 25 or the like, without contacting one surface of the opposite substrate 24 as shown in FIG. 8 in a state where the opposite substrate 24 is joined to the first surface 21a of the substrate 21, since the width of the concave portion 27 of the opposite substrate 24 and the diameter of the outflow port 25 and the inflow port 26 are set to be slightly larger than the width of the groove 22. Further, concavity or the depth of the concave portion 27 is set to be sufficiently larger than a maximum value of the height of the protrusions 23a protruding from the first surface 21a of the substrate 21, that is, a sum of the thickness of the photoresist 31 and the thickness of the aperture 32. Similarly, the protrusions 23a are set to be received in the space in the concave portion 27, the outflow port 25 or the like without contacting one surface of the opposite substrate 24, even if the aperture 32 of the photoresist 31 causes displacement and the protrusions 23a of the catalyst layer 23 remain on the first surface 21a of the substrate 21 outside the groove 22. Therefore, since the protrusions 23a of catalyst layer 23 do not contact one surface of the opposite substrate 24 even when the substrate 21 is affixed to the opposite substrate 24, fragments of the protrusions 23a do not remain in the interface between the substrate 21 and the opposite substrate 24 in a production process. It is thus possible to satisfactorily join the substrate 21 and the opposite substrate 24 with no unnecessary space between them, without any leakage of a fluid from the flow path 29.

Therefore, even if protrusions 23a of the catalyst layer 23 stick out and extend from the first surface 21a of the substrate 21 or the like, they will not be obstacles to the cathode joining process. Furthermore, in this case, it is possible to increase a superficial area of the catalyst only for the part of the protrusions 23a of catalyst layer 23 sticking upward on the first surface 21a of the substrate 21 and remaining, as compared with the case where the catalyst layer 23 is provided so as not to protrude from the groove 22. As a result, it is possible to make a reaction rate relatively high in the flow path 29, which is largely dependent upon the superficial area of the catalyst.

Figure 9:
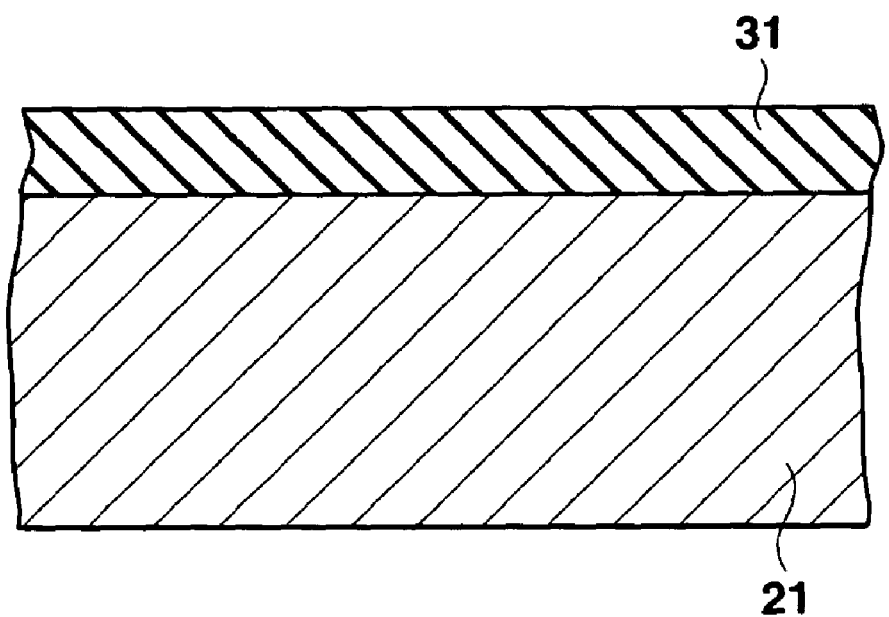
FIG. 9 is a sectional view of an initial process for production of a second example of the compact chemical reactor shown in FIG. 1 and FIG. 2.
Figure 10:
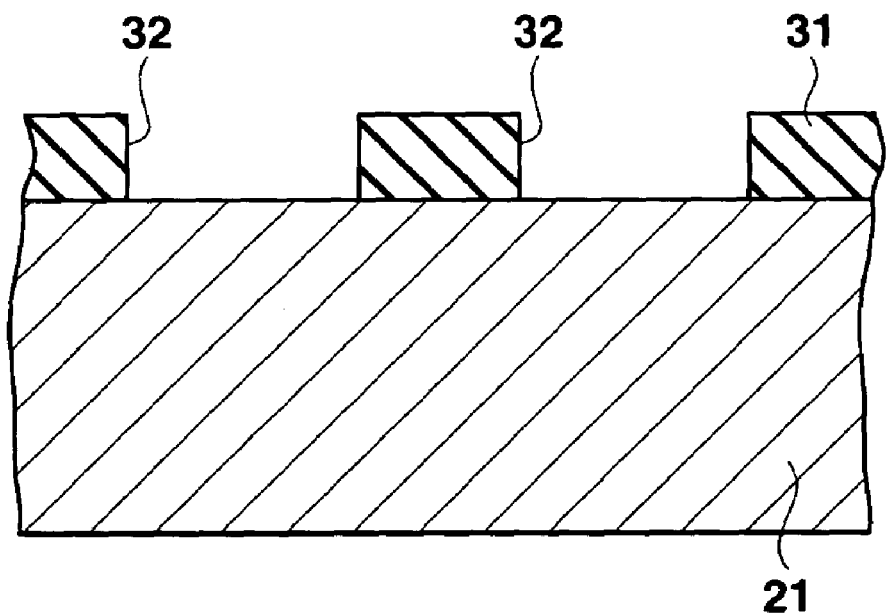
FIG. 10 is a sectional view of a process following FIG. 9.

Next, a second example of the method for producing the compact chemical reactor shown in FIG. 1 and FIG. 2 will be described. First, the photoresist 31 made of the dry film is affixed onto the first surface 21a of the compact substrate 21 as shown in FIG. 9. Next, as shown in FIG. 10, the photoresist 31 is patterned to form the aperture 32 at the portion of the photoresist 31 corresponding to a flow path formation area. Then, the minute meandering groove 22 is formed in the first surface 21a of the substrate 21 by etching with the photoresist 31 as a mask, as shown in FIG. 4. The processes after forming the catalyst layer 23 with the photoresist 31 as a mask are the same as those in the first example described above, and will thus be omitted.

The aperture 32 of the photoresist 31 is patterned in a different process from the process in which the groove 22 is patterned in the first example described above, so that the aperture 32 may sometimes displace from the groove 22, and moreover, a photoresist pattern must be formed to form the groove 22 apart from the photoresist 31, thus increasing the number of processes.

Contrarily, in the second example described above, the photoresist 31 is patterned to form the aperture 32 at the portion of the photoresist 31 corresponding to the flow path formation area as shown in FIG. 10, and then the first surface 21a of the substrate 21 is etched using an etching solution with the photoresist 31 as a mask to form the groove 22 as shown in FIG. 4, and subsequently, the catalyst layer 23 is formed in succession on the first surface 21a of the substrate 21 and on the photoresist 31, so that the position of the aperture 32 can correspond to the groove 22 as a result. Further, as the groove 22 is formed with the photoresist 31 as a mask, the number of processes can be reduced, and a distance between the grooves 22, 22 can be small with no need for a clearance for alignment errors, thereby enabling the substrate 21 to be smaller.

Next, the compact reactor according to this invention when applied to a fuel cell system using a fuel reforming type fuel cell will be described.

Figure 11:
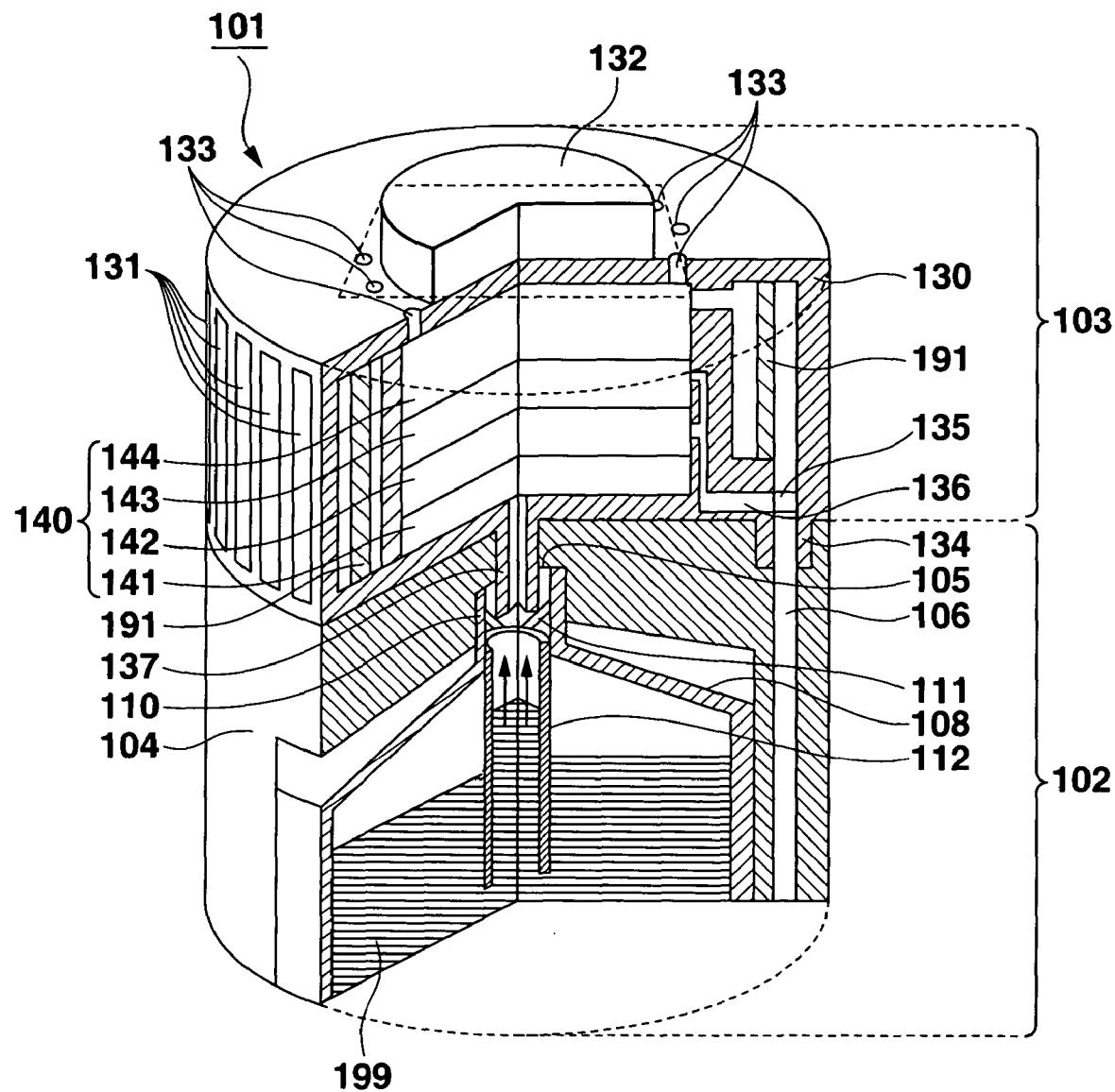
FIG. 11 is a perspective view showing a partially broken fuel storage module and power generation module of a power generation system having a compact chemical reactor system.

FIG. 11 is a perspective view showing a partially cut away power generation system 101 comprising the compact reactor and a fuel cell of the present invention.

As shown in FIG. 11, the power generation system 101 comprises a fuel storage module 102 which stores a fuel 199; and a power generation module 103 which has a built-in compact reformer system 140 comprising a reforming reaction section 142, an aqueous shift reaction section 143 and a selective oxidative reaction section 144 that are compact catalyst reactors produced by the production method of the present invention, and which generate electricity using the fuel 199 stored in the fuel storage module 102.

The fuel storage module 102 has a substantially cylindrical case 104 which can be detachably attached to the power generation module 103. A round throughhole 105 is formed at a head top portion of the case 104, and a first drain pipe 106 which allows by-product water produced by the power generation module 103 to flow is formed on an outer peripheral side of the case 104. A by-product collecting section 109 (FIG. 12) which stores water to be drained is disposed at a bottom of the fuel storage module 102. The by-product collecting section 109 is connected to the first drain pipe 106.

A fuel package 108 is housed inside the case 104, and part of an outer peripheral surface of the fuel package 108 is exposed outside the case 104. The liquid fuel 199 is stored inside the fuel package 108. The fuel package 108 is a transparent or semitransparent cylindrical member having an internal space, and is constituted of a biodegradable material degraded by bacteria or the like. As part of the fuel package 108 is exposed and the fuel package 108 is transparent or semitransparent, it is possible to easily check the presence and remaining amount of the fuel 199 inside through the fuel package 108.

The fuel 199 is a mixture of a liquid chemical fuel and water, and alcohols such as methanol and ethanol or carbon compounds containing a hydrogen element such as ether and gasoline are applicable as the chemical fuel. In the present embodiment, a mixture in which methanol and water are uniformly mixed at an equal mol is used as the fuel 199.

A supply port 110 for supplying the fuel 199 to the power generation module 103 is provided at the head top portion of the fuel package 108 in a manner to protrude to be inserted into the through-hole 105 of the case 104, and a check valve 111 is provided inside the supply port 110 which closes the entire supply port 110 in a state where an intake nipple portion 137 of the power generation module 103 is not inserted thereto. A supply pipe 112 extending in upward and downward directions to be inserted in the supply port 110 in FIG. 11 is provided inside the fuel package 108. The supply pipe 112 extends from the bottom of the fuel package 108 to a position immediately under the check valve 111 in the supply port 110. The check valve 111 closes the supply port 110 to prevent the fuel 199 from being leaked from the fuel package 108 to the outside.

Next, the power generation module 103 will be described.

The power generation module 103 comprises a substantially cylindrical case 130; the compact reformer system 140 disposed inside the case 130; a fuel cell 191 disposed on a periphery of the compact reformer system 140 and on an outer peripheral side of the case 130; and a by-product take-in section 135 which takes in part of the by-product produced by the fuel cell 191 and supplies this to the compact reformer system 140 as necessary.

A plurality of slits 131 for supplying oxygen in the air outside the power generation module 103 that is needed for power generation by the fuel cell 191 to the fuel cell 191 are formed so as to penetrate in a state arranged in parallel with each other outside the fuel cell 191 and on an outer peripheral wall surface of the case 130.

A terminal 132 for supplying electric energy generated by the fuel cell 191 to an external device is provided at the head top portion of the case 130. A plurality of air holes 133 for discharging carbon dioxide produced by the compact reformer system 140 and the fuel cell 191 are formed on a periphery of the terminal 132 and at the head top portion of the case 130.

A second drain pipe 134 is provided on the outer peripheral side of the case 130. The second drain pipe 134 protrudes downward from the bottom of the case 130, and is located at a position corresponding to the first drain pipe 106 of the fuel storage module 102. The second drain pipe 134 is a pipe for allowing by-product water produced by the fuel cell 191 to be distributed, and the by-product water is discharged to the by-product take-in section 135 through the second drain pipe 134 and the first drain pipe 106.

The second drain pipe 134 is coupled to the byproduct take-in section 135. A water introduction pipe 136 provided in the case 130 leads to the second drain pipe 134 via the by-product take-in section 135. The by-product take-in section 135 functions as a pump which introduces the by-product water produced by the fuel cell 191 to the compact reformer system 140 as necessary, and supplies a proper amount of water intended for the compact reformer system 140 to the water introduction pipe 136, and then discharges extra water to the second drain pipe 134. This makes it possible to heighten the concentration of chemical fuel except for water contained in the fuel 199 within the fuel package 108, and increase an amount of produced hydrogen per unit volume of the fuel.

The intake nipple portion 137 is centrally provided at the bottom of the case 130 so as to protrude downward. In the intake nipple portion 137, a minute flow path is formed which penetrates from a tip along a central line by the capillary phenomenon. The intake nipple portion 137 is disposed at a position corresponding to the through-hole 105 of the fuel storage module 102, and opens the check valve 111 to take in the fuel 199 from the fuel package 108.

In the fuel storage module 102 and the power generation module 103 as described above, when the fuel storage module 102 storing the fuel package 108 is attached (connected) to the power generation module 103, the second drain pipe 134 of the power generation module 103 is connected to the first drain pipe 106 of the fuel storage module 102 on an outer peripheral side of an area where the modules 102, 103 are connected. In this way, the second drain pipe 134 communicates with the first drain pipe 106, thereby making it possible to let the by-product water produced by the power generation module 103 flow from the second drain pipe 134 to the first drain pipe 106 to be discharged to the by-product take-in section 135.

On the other hand, the intake nipple portion 137 of the power generation module 103 is inserted into the through-hole 105 of the fuel storage module 102 and the supply port 110 of the fuel package 108 at a central portion where both the modules are connected, thereby pressing down the check valve 111 of the supply port 110 to open the check valve 111. In this way, the intake nipple portion 137 communicates with the supply pipe 112 of the fuel package 108, making it possible to supply the fuel 199 stored in the fuel package 108 from the supply pipe 112 to the intake nipple portion 137.

Next, the compact reformer system 140 built in the power generation module 103 will be described using FIG. 12 and FIG. 13. Here, FIG. 12 is a block diagram showing a configuration of the power generation system 101, and FIG. 13 is a sectional view showing the broken compact reformer system 140.

Figure 12:
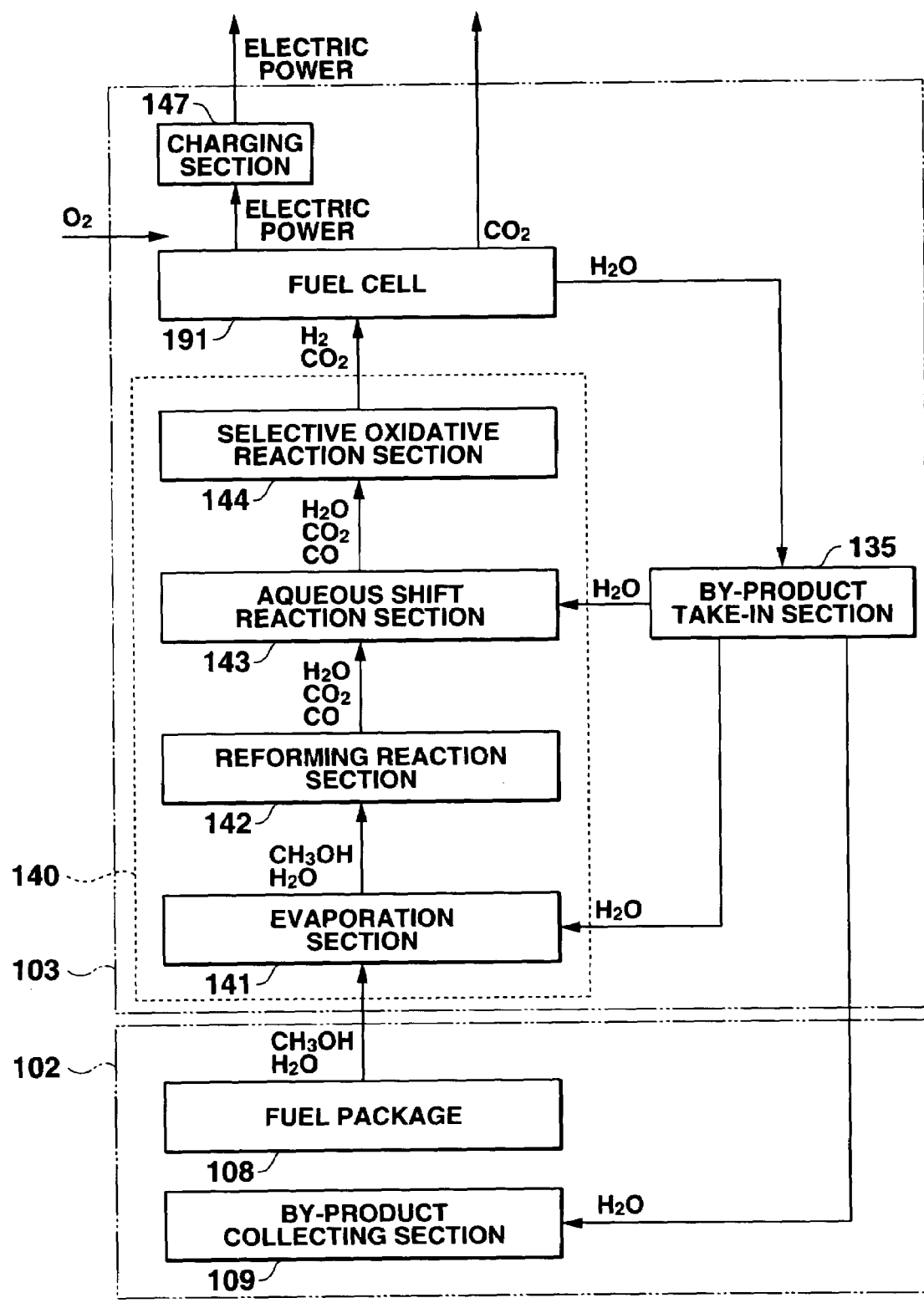
FIG. 12 is a block diagram showing a basic configuration of a fuel cell power generation system.
Figure 13:
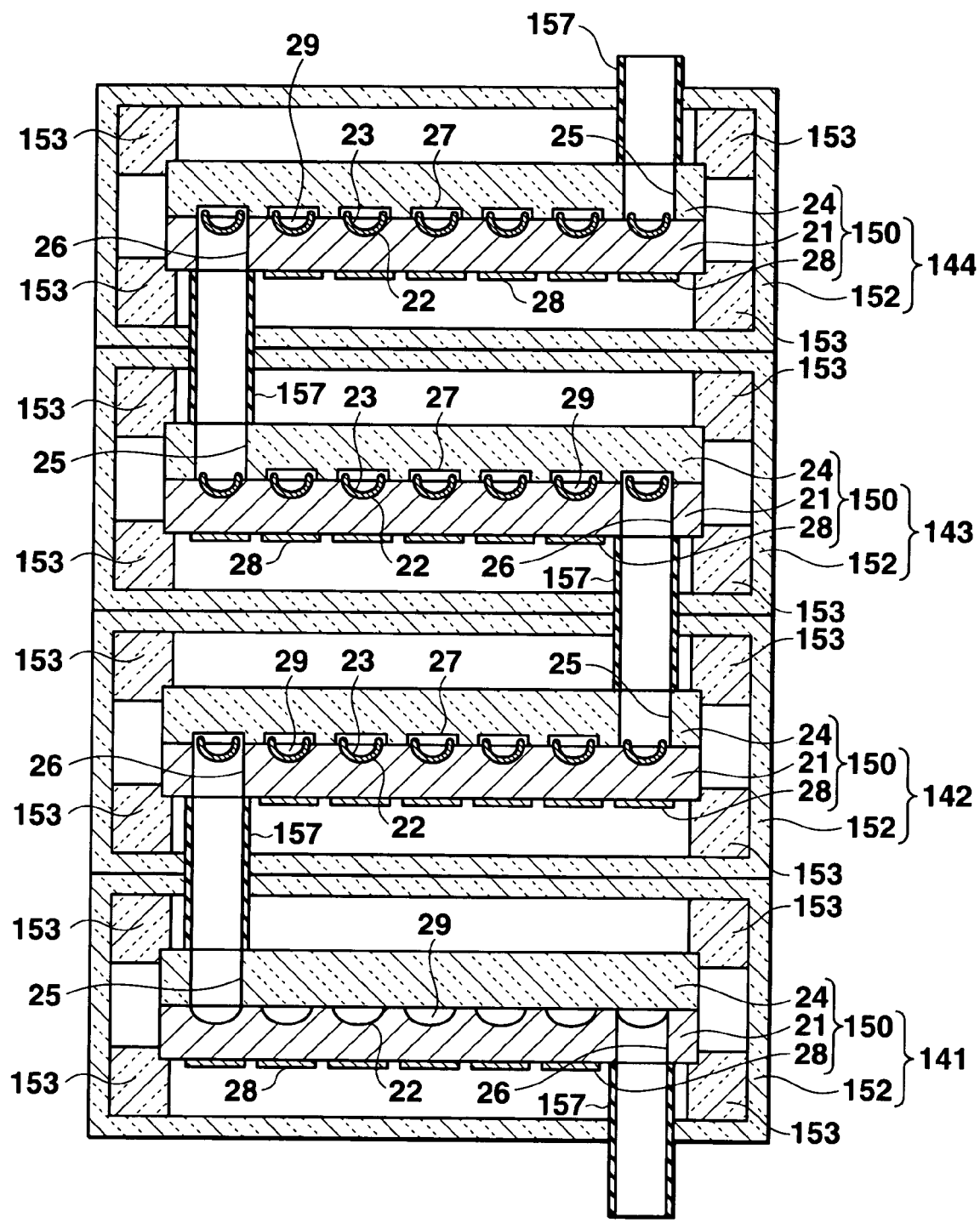
FIG. 13 is a side view showing a broken compact reformer system built in the power generation module.

As shown in FIG. 12 and FIG. 13, the compact reformer system 140 comprises an evaporation section 141 for heating the fuel 199 supplied from the fuel package 108 to evaporate the fuel 199; the reforming reaction section 142 for producing hydrogen gas from the fuel 199 vaporized by the evaporation section 141; the aqueous shift reaction section 143 for producing carbon dioxide and hydrogen gas from carbon monoxide gas and water contained in an air-fuel mixture supplied from the reforming reaction section 142 and lowering the concentration of carbon monoxide; and the selective oxidative reaction section 144 for oxidizing carbon monoxide gas contained in the air-fuel mixture supplied from the aqueous shift reaction section 143 to remove carbon monoxide. The evaporation section 141, the reforming reaction section 142, the aqueous shift reaction section 143 and the selective oxidative reaction section 144 are stacked in this order.

The reforming reaction section 142, the aqueous shift reaction section 143 and the selective oxidative reaction section 144 all apply the compact chemical reactor shown in FIG. 1, and comprise a reaction container main unit 150 having the thin film heater 28 for heating the flow path 29 and the catalyst layer 23; and an insulated package 152 containing the reaction container main unit 150 inside. The evaporation section 141 is substantially configured in the same way as the reforming reaction section 142, the aqueous shift reaction section 143 and the selective oxidative reaction section 144, except that the catalyst layer is not formed.

The insulated packages 152 of all the evaporation section 141, the reforming reaction section 142, the aqueous shift reaction section 143 and the selective oxidative reaction section 144 are constituted of an insulating material with low thermal conductivity, such as glass or the like having a thermal conductivity of 0 to 3 (W/m·K). A radiation reflecting film (not shown) formed of Au, Ag, Al or the like may be formed on an inner surface of the insulated package 152. The radiation reflecting film reflects electromagnetic waves containing infrared radiation at high reflectivity, and the radiation reflecting film reflects radiation heat emitted from the internal reaction container main unit 150 to prevent the heat from being transmitted outside the insulated package 152. This makes it possible to prevent radiation heat from being released outside the insulated package 152.

In all of the evaporation section 141, the reforming reaction section 142, the aqueous shift reaction section 143 and the selective oxidative reaction section 144, an internal space within each of the insulated packages 152 is set to a pressure lower than atmospheric pressure, or the internal space within the insulated package 152 is charged with a multi-halogenated derivative gas (freon (brand name) gas) containing fluorine which has low thermal conductivity and is inert, or with carbon dioxide gas. A multi-halogenated derivative gas containing fluorine includes, for example, trichlorofluoromethane, dichlorodifluoromethane. Therefore, this structure makes it difficult for the heat of the thin film heater 28 to be transmitted to the insulated package 152.

In all of the evaporation section 141, the reforming reaction section 142, the aqueous shift reaction section 143 and the selective oxidative reaction section 144, insulation supports 153 are disposed at corners of the internal surface of the insulated package 152. The reaction container main unit 150 is placed inside the insulated package 152 in a manner to maintain a distance from the internal wall of the insulated package 152, while being supported by the insulation supports 153. The reaction container main units 150 of all the evaporation section 141, the reforming reaction section 142, the aqueous shift reaction section 143 and the selective oxidative reaction section 144 have a structure that superposes the substrate 21 formed of a material such as silicon or aluminum having a high thermal conductivity on the substrate 24 formed of material such as glass having a low thermal conductivity in order to join these substrates. At a joint portion between the substrate 21 and the substrate 24, a zigzag micro flow path 29 is formed along the joint portion, and the groove 22 is arch shaped, when viewed in cross section.

The thin film heater 28 is made by forming an electric-resistance heating element or a semiconductor heating element into a thin film, and generates heat with electric energy when an electric current or a voltage is applied thereto. Lead wires (not shown) are respectively connected to both ends of the zigzag thin film heater 28, and the lead wires both penetrate the insulated package 152 and extend to the outside of the insulated package 152. The thin film heater 28 is appropriately supplied with electric energy through the lead wires to maintain a proper temperature. Portions through which the lead wires penetrate are sealed, so that the gas does not leak from/to the internal space and the outside of the insulated package 152.

As shown in FIG. 13, a pipe 157 has a function to take in and out a fluid to and from the compact chemical reactor. The pipe 157 whose one end is coupled to the substrate 21 of the evaporation section 141 has the other end penetrating through the insulated package 152 to be coupled to the intake nipple portion 137 (FIG. 11) via an unshown valve or pump. The fuel 199 stored in the fuel package 108 is supplied to the micro flow path 29 of the evaporation section 141 through the intake nipple portion 137 and the pipe 157. A flow volume of the fuel 199 flowing through the flow path 29 of the evaporation section 141 can be adjusted by the valve or pump.

The pipe 157 between the evaporation section 141 and the reforming reaction section 142 has one end coupled to the outflow port 25 of the substrate 24 of the evaporation section 141 and the other end coupled to the inflow port 26 of the substrate 21 of the reforming reaction section 142, thereby linking the flow path 29 of the evaporation section 141 to the flow path 29 of the reforming reaction section 142.

The pipe 157 between the reforming reaction section 142 and the aqueous shift reaction section 143 has one end coupled to the outflow port 25 of the substrate 24 of the reforming reaction section 142 and the other end coupled to the inflow port 26 of the substrate 21 of the aqueous shift reaction section 143, thereby linking the flow path 29 of the reforming reaction section 142 to the flow path 29 of the aqueous shift reaction section 143.

The pipe 157 between the aqueous shift reaction section 143 and the selective oxidative reaction section 144 has one end coupled to the outflow port 25 of the substrate 24 of the aqueous shift reaction section 143 and the other end coupled to the inflow port 26 of the substrate 21 of the selective oxidative reaction section 144, thereby linking the flow path 29 of the aqueous shift reaction section 143 to the flow path 29 of the selective oxidative reaction section 144.

The pipe 157 whose one end is coupled to the substrate 24 of the selective oxidative reaction section 144 has the other end penetrating through the insulated package 152 to be coupled to the fuel cell 191 via an unshown valve or pump. A flow volume of hydrogen supplied to the fuel cell 191 can be adjusted by the valve or pump.

When the fuel 199 from the fuel storage module 102 is supplied into the flow path 29 via the inflow port 26, the evaporation section 141 vaporizes the fuel 199 in a space within the flow path 29 heated together with the substrate 21 by the heat (about 120° C.) generated by the thin film heater 28, and allows the vaporized fuel gas for power generation (e.g., $CH_3OH+H_2O$ when the fuel for power generation is a methanol aqueous solution) to flow out from the outflow port 25.

The reaction container main units 150 of all the reforming reaction section 142, the aqueous shift reaction section 143 and the selective oxidative reaction section 144 are provided with the catalyst layer 23 made of a metal, metal oxide or the like on an inner peripheral surface of the micro flow path 29. The catalyst layers 23 of the reforming reaction section 142, the aqueous shift reaction section 143 and the selective oxidative reaction section 144, may be formed of the same material or may be formed of a different material. Further, in any of the reforming reaction section 142, the aqueous shift reaction section 143 and the selective oxidative reaction section 144, the catalyst layer 23 of one reactor may be formed of one kind of material or may be formed of plural kinds of material to be different depending on the positions within the micro flow path 29.

The catalyst layer 23 of the reforming reaction section 142 is made of a material containing a reformed catalyst such as, ZnO, $Al_2O_3$, and reacts methanol, which is a fluid evaporated by the evaporation section 141, with water, to promote the production of carbon dioxide and water, as in the following chemical equation (1).

$$CH_3OH+H_2O \rightarrow 3H_2+CO_2 \qquad (1)$$

The catalyst layer 23 of the aqueous shift reaction section 143 reacts carbon monoxide produced in a significantly small amount by the reforming reaction section 142 with water to promote the production of carbon dioxide and water, as in the following chemical equation (2).

$$CO+H_2O \rightarrow CO_2+H_2 \qquad (2)$$

The catalyst layer 23 of the selective oxidative reaction section 144 is made of Pt, $Al_2O_3$, for example, and reacts carbon monoxide which has not completely reacted in the aqueous shift reaction section 143 with oxygen to promote the production of carbon dioxide, as in the following chemical equation (3).

$$2CO+O_2 \rightarrow 2CO_2 \qquad (3)$$

In the present embodiment, the inner peripheral surface of the micro flow path 29 of the evaporation section 141 is not provided with the catalyst layer, but the catalyst layer which promotes the reaction in the chemical equation (1) may be provided on the inner peripheral surface of the micro flow path 29 of the evaporation section 141.

When the vaporized fuel 199 supplied from the evaporation section 141 is supplied into the flow path 29 via the inflow port 26, the reforming reaction section 142 causes the reaction as in the chemical equation (1) due to the heat (about 280° C.) generated by the thin film heater 28, thus producing hydrogen, by-product carbon dioxide, and in some cases a significantly small amount of carbon monoxide. Then, a produced fluid such as hydrogen flows out from the outflow port 25.

Water ($H_2O$) on the left side of the above equation (1) may be water contained in the fuel 199 in the fuel storage module 102 at an initial stage of the reaction, but the by-product take-in section 135 may collect water produced by power generation of the fuel cell 191 described later to supply the water to the reforming reaction section 142. In addition, a supply source of water ($H_2O$) on the left side of the above equation (1) may be only the fuel cell 191, may be both the fuel cell 191 and the fuel storage module 102, and may be only the fuel storage module 102.

Carbon monoxide, which is the by-product in the fluid flowing from the outflow port 25 of the reforming reaction section 142 to the inflow port 26 of the aqueous shift reaction section 143, reacts with water in the space within the flow path 29 of the aqueous shift reaction section 143 to produce hydrogen due to the heat generation of the thin film heater 28, so that a fluid containing a higher concentration of hydrogen flows out from the outflow port 25 in the aqueous shift reaction section 143.

Carbon monoxide which remains in the fluid flowing from the outflow port 25 of the aqueous shift reaction section 143 to the inflow port 26 of the selective oxidative reaction section 144 reacts with oxygen in the space within the flow path 29 of the selective oxidative reaction section 144 to become carbon dioxide due to the heat generation (about 180° C.) of the thin film heater 28, so that a fluid containing hydrogen and carbon dioxide flows out from the outflow port 25 in the selective oxidative reaction section 144.

In this way, the reforming reaction section 142 reforms the fuel 191 to make hydrogen to be supplied to the fuel cell 191, the aqueous shift reaction section 143 and the selective oxidative reaction section 144 remove and detoxify carbon monoxide, which is a toxic by-product produced by the reforming reaction section 142.

The fluid after a series of reactions described above contains hydrogen and carbon dioxide, and out of these products, carbon dioxide is released outside from the air holes 133. The aqueous shift reaction section 143 or the selective oxidative reaction section 144 may be provided between the evaporation section 141 and the reforming reaction section 142.

Figure 14:
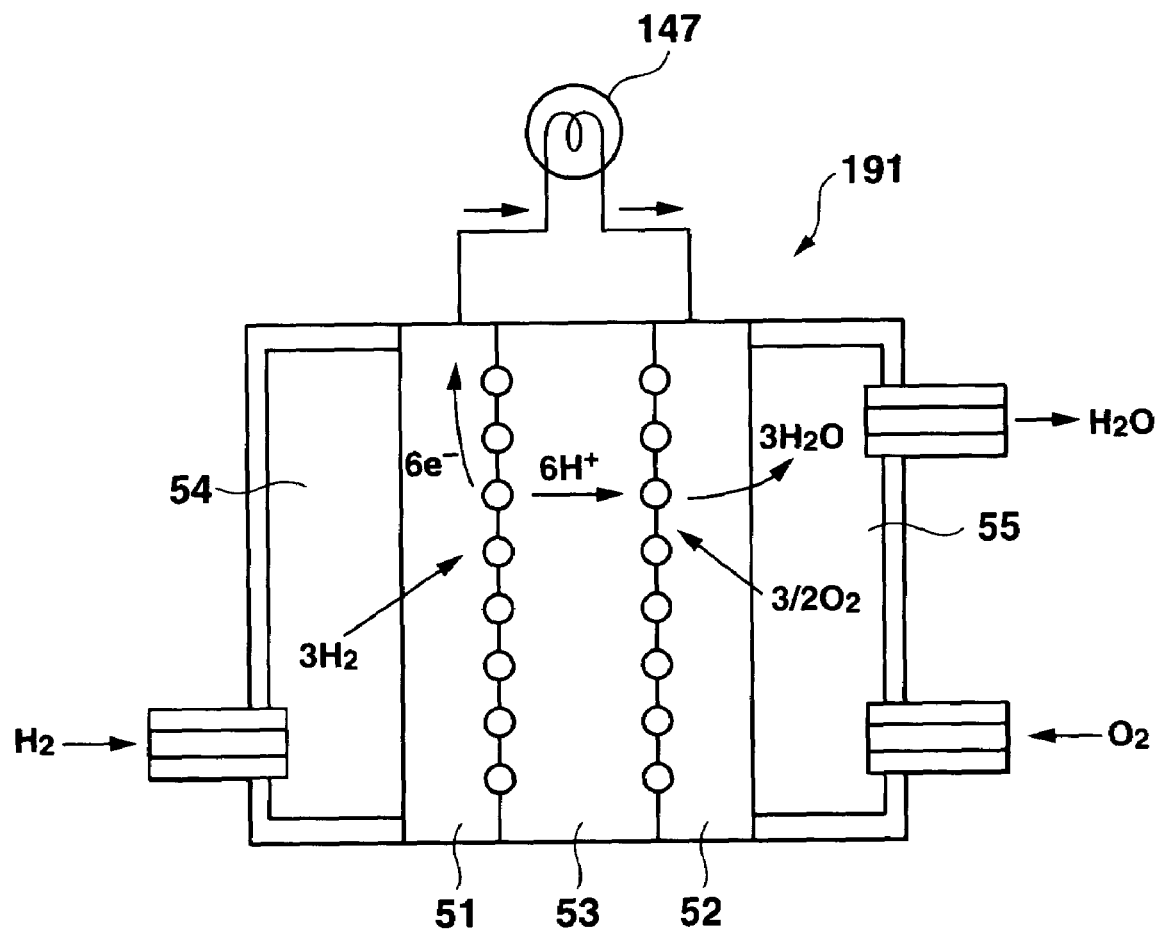
FIG. 14 is a schematic configuration view of a power generation section of an associated compact power generation type power source.

Next, the fuel cell 191 is constituted of a known solid macromolecule type fuel cell as shown in FIG. 14. In other words, as shown in FIG. 14, the fuel cell 191 is constituted by having a cathode 51 made of a carbon electrode supporting catalysts such as Pt and C; an anode 52 made of a carbon electrode supporting catalysts such as Pt, Ru and C; and a film-like ion conductive film 53 placed between the cathode 51 and anode 52, thereby supplying electric power to a charging section 147 constituted of a secondary cell or a capacitor provided between the cathode 51 and anode 52.

In this case, a space section 54 is provided outside the cathode 51. Hydrogen ($H_2$) from the selective oxidative reaction section 144 is supplied into the space section 54, and thus hydrogen is supplied to the cathode 51. Further, a space section 55 is provided outside the anode 52. Oxygen ($O_2$) taken in from the atmosphere via the check valve is supplied into the space section 55, and thus oxygen is supplied to the anode 52.

Hydrogen ions (proton $H^+$) in which electrons (e-) are separated from hydrogen are produced on a side of the cathode 51 as shown in the following equation (4), and pass to a side of the anode 52 via the ion conductive film 53, and then the cathode 51 takes out electrons (e-) therefrom to supply them to the charging section 147.

$$3H_2 \rightarrow 6H^+ + 6e^- \qquad (4)$$

On the other hand, electrons (e-) supplied by way of the charging section 147, hydrogen ions ($H^+$) passed through the ion conductive film 53 and oxygen react on the side of the anode 52 as shown in the following equation (5), thereby producing by-product water.

$$6H^+ + (3/2)O_2 + 6e^- \rightarrow 3H_2O \qquad (5)$$

The series of electrochemical reactions described above (equation (4) and equation (5)) proceeds under an environment at a relatively low temperature of about room temperature to 8° C., and water is basically the only by-product except for electric power. The electric power generated by the fuel cell 191 is supplied to the charging section 147, whereby the charging section 147 is charged and the charging section 147 properly supplies electricity to an external device via the terminal 132.

Water, as the by-product produced by the fuel cell 191, is finally collected by the by-product collecting section 109 via the by-product take-in section 135, so that it does not flow outside the power generation system 101. Furthermore, while at least one of the evaporation section 141 and the aqueous shift reaction section 143 is operating as described above, at least part of water produced by the fuel cell 191 may be controlled to be supplied to the operating compact reaction section.

Figure 15:
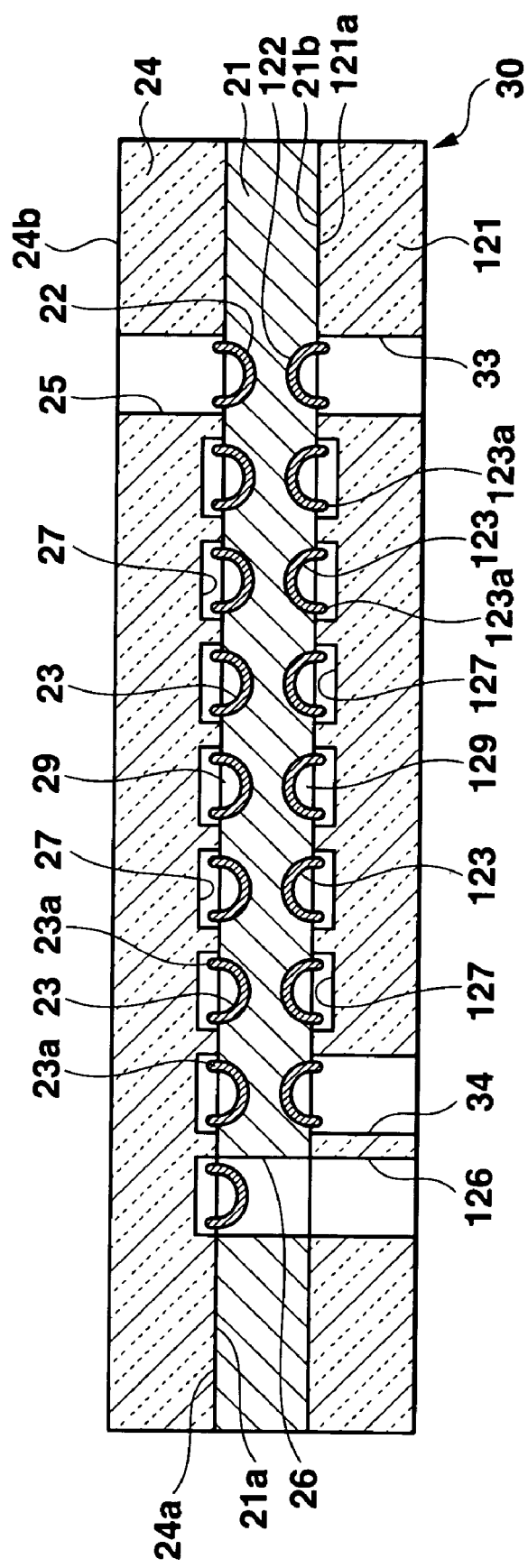
FIG. 15 is a transmitted plan view of another compact chemical reactor of this invention.
Figure 16:
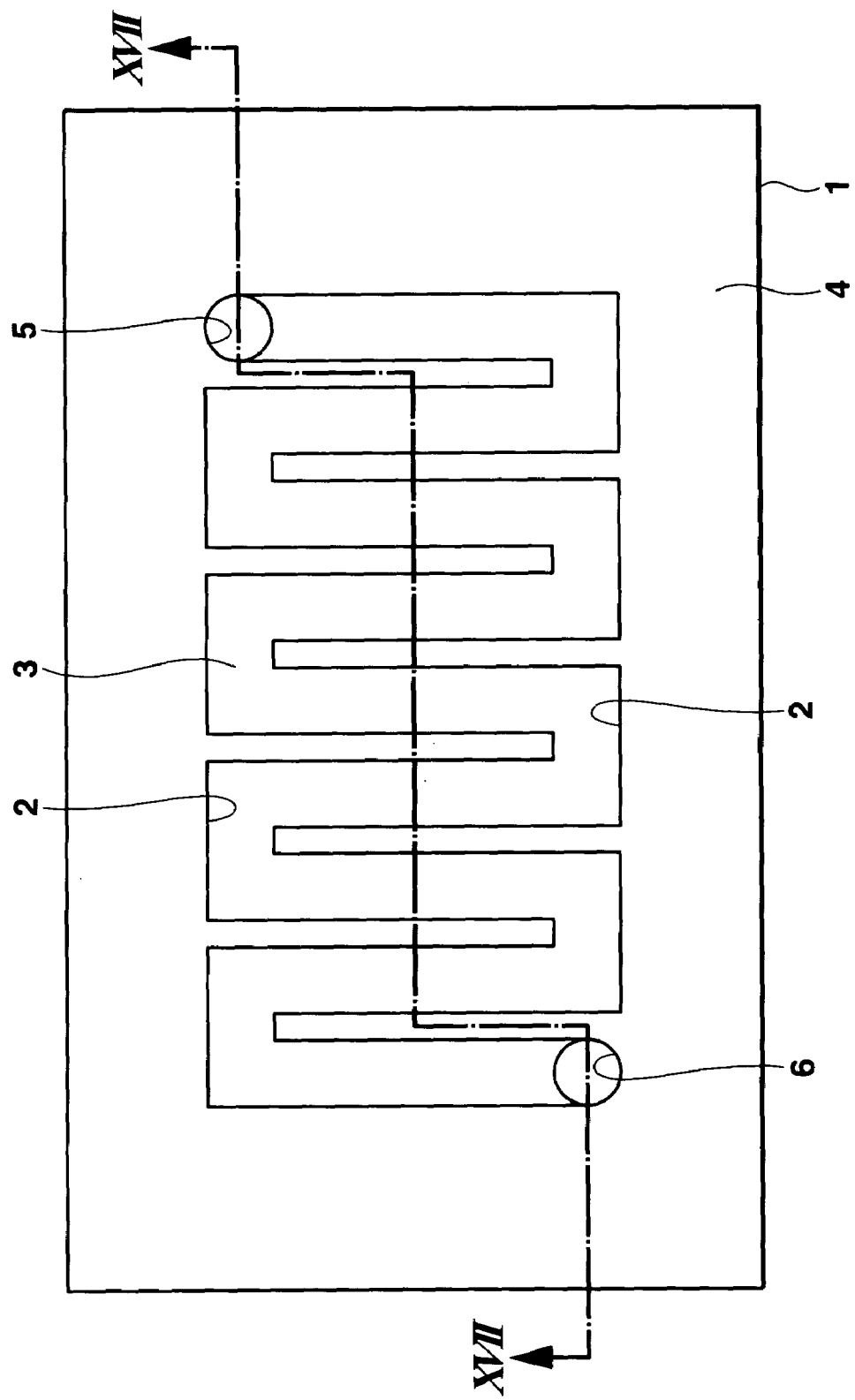
FIG. 16 is a transmitted plan view of an example of an associated compact chemical reactor.
Figure 17:
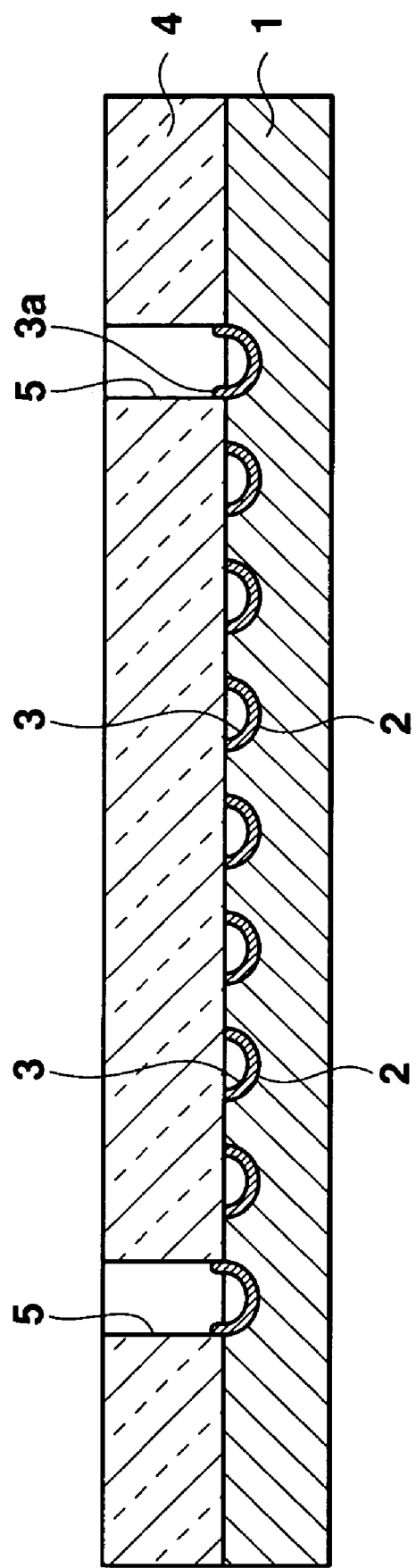
FIG. 17 is a sectional view along the line XVII—XVII of FIG. 16.
Figure 18:
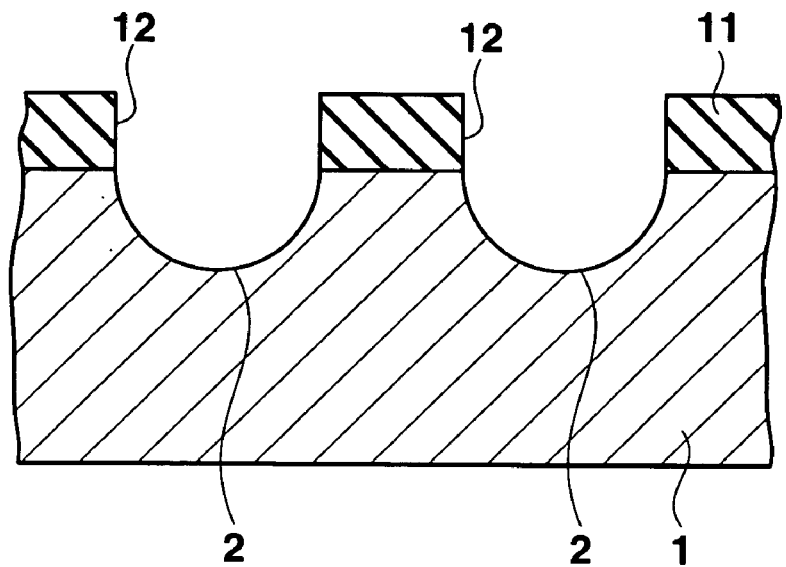
FIG. 18 is a sectional view of an initial process for production of the compact chemical reactor shown in FIG. 16 and FIG. 17.
Figure 19:
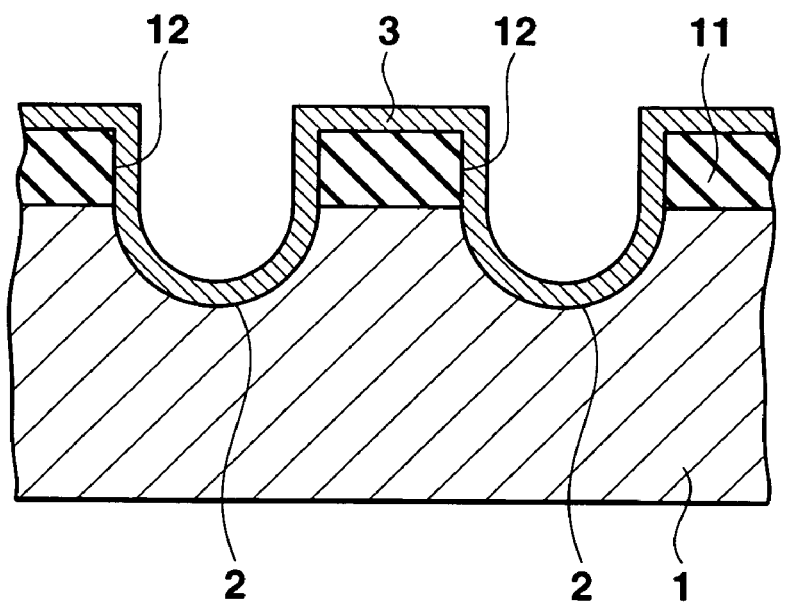
FIG. 19 is a sectional view of a process following FIG. 18.
Figure 20:
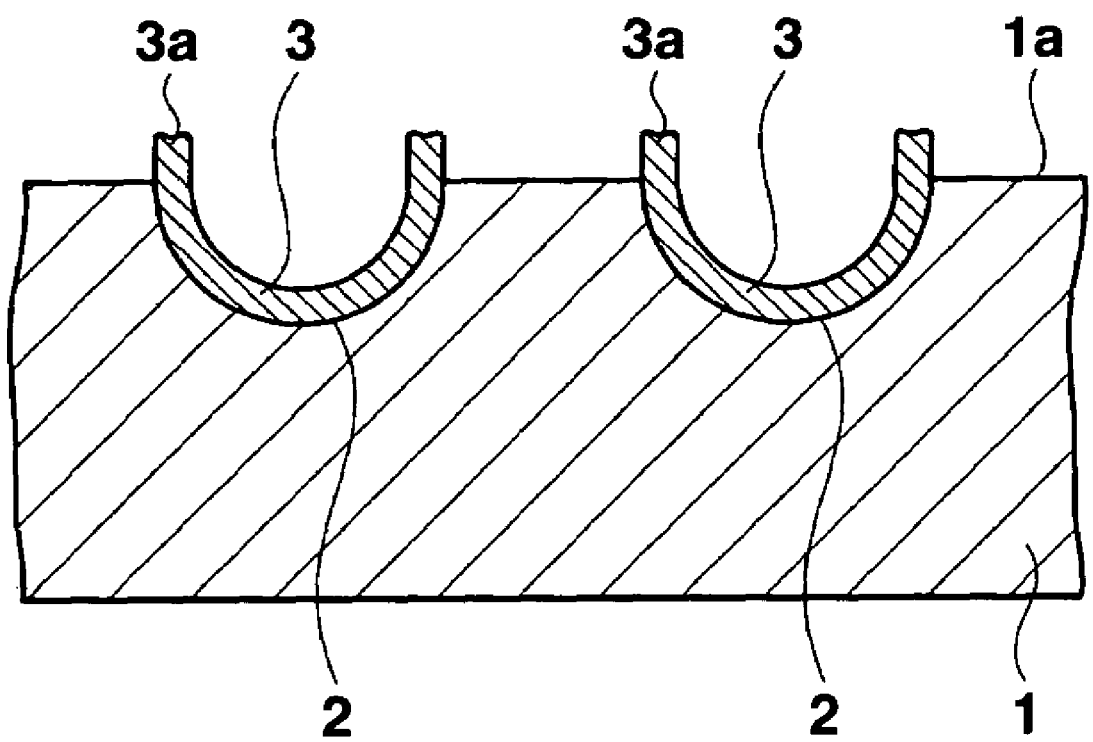
FIG. 20 is a sectional view of a process following FIG. 19.

The catalyst layer 23 and the flow path 29 in the compact reactor are heated by the thin film heater 28 made of a resistive element thin film in the embodiment described above, but may be heated by a combustion section 30 which burns part of the fuel 199 as shown in FIG. 15. In the combustion section 30, a groove 122 is formed in the second surface 21b of the substrate 21 of each of the reforming reaction section 142, the aqueous shift reaction section 143 and the selective oxidative reaction section 144 similarly to the first surface 21a. A catalyst layer 123 having protrusions 123a are formed on a surface of the groove 122 at a position opposite to the catalyst layer 23 of the compact reactor, and the catalyst layer 123 has a catalyst which promotes a chemical reaction to burn burnable components in the fuel 199 that flows in.

An opposite substrate 121 having an opposite surface 121a is affixed to the second surface 21b of the substrate 21. The opposite surface 121a of the opposite substrate 121 has a concave portion 127 which becomes a space for receiving the protrusions 123a protruding from the second surface 21b. The substrate 21 and the opposite substrate 121 are joined in a manner that the concave portion 127 contacts the protrusions 123a as little as possible. In other words, the depth of the concave portion 127 is set to be larger than the height of the protrusions 123a, and the width of the concave portion 127 is set to be larger than the width of the groove 122. In this way, a flow path 129, through which the catalyst layer 123 allows a burnable fuel to flow, is formed by the covering of the groove 122 and the concave portion 127.

The opposite substrate 121 is provided with an inflow port 34 and an outflow port 33 penetrating in a thickness direction at one and the other ends of the groove 122. The inflow port 34 is an entrance from which the fuel 199 flows in, and the outflow port 33 is an exit from which a fluid produced when the fuel 199 is burnt is discharged, and they are both provided at positions which do not block the outflow port 25 and the inflow port 26 of the compact reactor.

An inflow port 126 is formed in the opposite substrate 121, which penetrates in a manner that an opening position thereof corresponds to the inflow port 26 provided in the substrate 21, thus providing a configuration that allows a fluid to flow from the inflow port 126 to the inflow port 26.

The compact reactors such as the reforming reaction section 142, the aqueous shift reaction section 143 and the selective oxidative reaction section 144 are heated by providing the respective combustion sections 30 as above, thereby making it possible to promote reactions in the compact reactors.

The fuel burnt by the combustion section 30 may be a fuel whose components are different from those of the fuel 199 reformed to hydrogen by the reforming reaction section 142, and may be sealed in the fuel package provided in the fuel storage module 102 other than the fuel package 108 in which the fuel 199 is sealed.

Furthermore, each of the compact reactors such as the reforming reaction section 142, the aqueous shift reaction section 143 and the selective oxidative reaction section 144 may be heated by both the combustion section 30 and the thin film heater 28. In this case, it is preferable that the thin film heater 28 be provided on one side of the substrate 21 and the combustion section 30 be provided on the other side of the substrate 21.

Furthermore, at least one of the thin film heater 28 and the combustion section 30 is provided in all of the evaporation section 141, the reforming reaction section 142, the aqueous shift reaction section 143 and the selective oxidative reaction section 144 in the embodiments described above, but if the thin film heater 28 and the combustion section 30 can be commonly used as heating means for a plurality of reactors, the number of the thin film heaters 28 may be smaller than the number of the evaporation section 141, the reforming reaction section 142, the aqueous shift reaction section 143 and the selective oxidative reaction section 144, and the number of the combustion sections 30 may be smaller than the number of the evaporation section 141, the reforming reaction section 142, the aqueous shift reaction section 143 and the selective oxidative reaction section 144.

The fuel applied to the fuel cell of the fuel-reforming system presently under research and development may be a fuel which is at least a liquid fuel, liquefied fuel or gas fuel containing hydrogen elements and from which electric energy can be generated by the fuel cell 191 at a relatively high energy conversion efficiency, and moreover fluid materials that may be satisfactorily applied would include: alcoholic liquid fuels such as ethanol and butanol apart from methanol mentioned above, liquid fuels made of carbon hydride which is vaporized at normal temperatures and at normal pressures, for example liquefied gases such as dimethyl ether, isobutane and natural gas (CNG), or a gas fuel such as a hydrogen gas.

If one made of a dry film is used as the photoresist, the photoresist can be removed by peeling off together with unnecessary portions of the catalyst layer formed on the photoresist, so that the photoresist made of the dry film does not damage the remaining catalyst layer because it does not contact the catalyst layer remaining in the flow path, whereby the catalyst layer can well perform catalytic action. In addition, since the concave portion is formed on the surface facing the opposite substrate at the portion corresponding to the catalyst layer without contacting the catalyst layer, it is possible to ensure that the opposite substrate is joined to the first surface of the substrate even if the catalyst layer formed on the inner wall surface of the aperture of the photoresist is not removed together with the photoresist and sticks out and remains on the first surface of the substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compact chemical reactor comprising:
   a first substrate including a first surface and a groove formed in the first surface;
   a catalyst layer which is provided on an inner surface of the groove formed in the first surface of the first substrate, and which has a protrusion protruding outward from the first surface of the first substrate; and
   a second substrate including a surface which contacts the first surface of the first substrate, and a concave portion formed in the surface of the second substrate to receive the protrusion of the catalyst layer such that the second substrate contacts the first surface of the first substrate so as not to contact the protrusion.

2. The compact chemical reactor according to claim 1, wherein a width of the concave portion is set to be at least 105% of a width of the groove.

3. The compact chemical reactor according to claim 1, wherein the first substrate comprises a silicon substrate.

4. The compact chemical reactor according to claim 1, wherein the second substrate comprises a glass substrate.

5. The compact chemical reactor according to claim 1, wherein the first substrate and the second substrate are anode-connected.

6. The compact chemical reactor according to claim 1, wherein a flow path is formed in a space defined by the groove of the first substrate and the concave portion of the second substrate.

7. The compact chemical reactor according to claim 6, wherein the flow path is configured to allow a material containing hydrogen to flow as a fluid.

8. The compact chemical reactor according to claim 6, wherein the catalyst layer has a catalytic action which causes a chemical reaction to occur in a fluid flowing into the flow path.

9. The compact chemical reactor according to claim 1, wherein a heat generation member is provided on a second surface of the first substrate that is opposite to the first surface.

10. The compact chemical reactor according to claim 9, wherein the heat generation member comprises an electrically resistive element.

11. The compact chemical reactor according to claim 9, wherein the heat generation member heats by burning.

12. The compact chemical reactor according to claim 11, wherein the heat generation member includes a groove formed in the second surface of the first substrate, a catalyst layer for burning provided in the groove in the second surface, and a third substrate for burning having a concave portion to receive a portion of the catalyst layer for burning.

13. A compact chemical reactor system comprising a plurality of compact chemical reactors, wherein each of the compact chemical reactors comprises:
- a first substrate including a first surface and a groove formed in the first surface;
- a catalyst layer which is provided on an inner surface of the groove formed in the first surface of the first substrate, and which has a protrusion protruding outward from the first surface of the first substrate; and
- a second substrate in which a concave portion to receive the protrusion of the catalyst layer is formed in a surface opposite to the first surface of the first substrate, and which contacts the first surface of the first substrate so as not to contact the protrusion,
- wherein at least some of the plurality of compact chemical reactors are arranged so that the respective grooves thereof are coupled to each other.

14. The compact chemical reactor system according to claim 13, wherein each of the compact chemical reactors comprises one of a reforming reaction section, an aqueous shift reaction section and a selective oxidative reaction section.

15. The compact chemical reactor system according to claim 13, wherein the plurality of compact chemical reactors are configured by accumulating the compact chemical reactors.

16. The compact chemical reactor system according to claim 13, wherein the plurality of compact chemical reactors comprise heat generation members.

17. The compact chemical reactor system according to claim 13, wherein each of the compact chemical reactors further comprises a heat generation member which includes a groove formed in the second surface of the first substrate that is opposite to the first surface, a catalyst layer for burning provided in the groove in the second surface, and a third substrate for burning having a concave portion to receive a portion of the catalyst layer for burning.

18. A compact chemical reactor system comprising:
(a) a compact chemical reactor which includes:
- a first substrate including a first surface and a groove formed in the first surface;
- a catalyst layer which is provided on an inner surface of the groove formed in the first surface of the first substrate, and which has a protrusion protruding outward from the first surface of the first substrate; and
- a second substrate, in which a concave portion to receive the protrusion of the catalyst layer is formed in a surface opposite to the first surface of the first substrate, and which contacts the first surface of the first substrate so as not to contact the protrusion, and (b) a power generation section which generates electricity using a reformed material produced by a reaction in the compact chemical reactor.

19. The compact chemical reactor system according to claim 18, wherein the compact chemical reactor system comprises a plurality of the compact chemical reactors, and each of the plurality of compact chemical reactors comprises one of a reforming reaction section, an aqueous shift reaction section and a selective oxidative reaction section.

20. The compact chemical reactor system according to claim 18, wherein the power generation section comprises a fuel cell.

* * * * *